(12) United States Patent
Nakazawa

(10) Patent No.: US 6,429,620 B2
(45) Date of Patent: Aug. 6, 2002

(54) MOTOR CONTROL DEVICE

(75) Inventor: Yosuke Nakazawa, Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/751,387

(22) Filed: Jan. 2, 2001

(30) Foreign Application Priority Data

Jan. 7, 2000 (JP) ........................................ 2000-001652

(51) Int. Cl.[7] .................................................. H02P 7/05
(52) U.S. Cl. ........................ 318/701; 318/254; 318/459
(58) Field of Search ................................. 318/254, 368, 318/459, 500, 504, 700, 701, 702, 703; 388/928.1

(56) References Cited

U.S. PATENT DOCUMENTS 3,769,564 A * 10/1973 Rettig
4,740,738 A * 4/1988 El-Antably et al. .......... 318/701
5,864,218 A * 1/1999 Orthmann .................... 318/701
5,900,712 A * 5/1999 Disser et al. ................ 318/701
6,208,108 B1 * 3/2001 Nashiki et al. .............. 318/701

* cited by examiner

Primary Examiner—Bentsu Ro
(74) Attorney, Agent, or Firm—Foley & Lardner

(57) ABSTRACT

The present invention is a motor control device for controlling current command values in relation to a permanent magnet reluctance motor which generates torque corresponding to the combined value of the torque resulting from the permanent magnet and the reluctance torque through field-weakening control in such a manner that the motor terminal voltage does not exceed the maximum inverter output voltage. In particular it controls the angle of the current relative to the motor rotor which is required for the purpose of field-weakening control, and ensures that this is stable and effective whatever torque is output.

7 Claims, 11 Drawing Sheets

US 6,429,620 B2

MOTOR CONTROL DEVICE

BACKGROUND TO THE INVENTION

1. Field of the Invention

The present invention relates to a motor control device for controlling a permanent magnet reluctance motor.

2. Description of the Related Art

It has hitherto been common practice to implement field-weakening control during constant output operation in permanent magnet and reluctance motors when inverter-driven for use in electric trains, electric motor vehicles and similar applications, the aim being to ensure that the motor terminal voltage is lower than the maximum voltage which the inverter is capable of outputting.

FIG. 1 illustrates an example of a conventional motor control device with field-weakening control of this kind. This control device has a dq axes current command setting unit 11, a d-axis current command correction unit 14, a d-axis current control unit 16, a q-axis current control unit 17, a voltage vector length calculation unit 18, a voltage vector length restriction unit 19, a terminal voltage uniformity control unit 20, and a dq three-phase transformation unit 21. It should be added that in this example of the prior art it is assumed that the permanent magnet reluctance motor is driven under vector control.

The dq axes current command setting unit 11 inputs the torque command Tref, determining the d-axis current command Idref and q-axis current command Iqref required in order to output this torque. The d-axis current command Idref is corrected by the d-axis current command correction unit 14 by adding the d-axis current command correction value ΔIdref from the terminal voltage uniformity control unit 20, and this is input to the d-axis current control unit 16. The q-axis current command Iqref is input to the q-axis current control unit 17.

The d-axis current control unit 16 inputs the d-axis current command Idref fed from the d-axis current command correction unit 14 and the d-axis current feedback value Id, and generates a d-axis voltage command Vd in such a manner that the d-axis current feedback value Id tracks the d-axis current command Idref. This is input to the dq three-phase transformation unit 21. Similarly, the q-axis current control unit 17 inputs the q-axis current command Iqref fed from the q-axis current command correction unit 11 and the q-axis current feedback value Iq, and generates a q-axis voltage command Vq in such a manner that the q-axis current feedback value Iq tracks the q-axis current command Iqref. This is input to the dq three-phase transformation unit 21. The dq three-phase transformation unit 21 generates the three-phase voltage commands Vu, Vv and Vw on the basis of the d-axis voltage command Vd, the q-axis voltage command Vq and the motor rotor potential θr, controlling the motor by way of a voltage transformer not illustrated in the drawing in order to achieve this.

The voltage vector length calculation unit 18 inputs the dq axes voltage commands Vd and Vq and calculates the voltage vector length (absolute voltage value) Vl. The voltage vector length restriction unit 19 inputs the resultant voltage vector length Vl and the inverter input direct-current voltage Vdc, and determines the restricted voltage vector restriction length Vllim. The terminal voltage uniformity control unit 20 calculates the current command correction value ΔIdref on the basis of the voltage vector length Vl and the voltage vector restriction length Vllim, and inputs it to the d-axis current command correction unit 14 as already mentioned.

In the drawing, the circuit elements represented by the codes 18, 19, 20 and 14 are for the purpose of field-weakening control. Field-weakening control of a permanent magnet motor generally involves running an armature current or minus d-axis current, so to speak, so that the magnetic flux of the permanent magnet and the magnetic flux created by the current flowing to the motor armature are in opposite directions. In a reluctance motor, on the other hand, where there is a large inductance value axis (q-axis) and a small inductance value axis (d-axis), it is normal to achieve field-weakening control by reducing the more effective q-axis current.

However, when it is sought to implement field-weakening control in a motor which generates a combination of reluctance torque and torque resulting from a permanent magnet, this can prove ineffective depending on the magnitude of the current amplitude rendered variable by the torque which it is desired to output if the current which is allowed to flow for this purpose is fixed on either the d-axis or the q-axis. The result is that it becomes impossible to control the motor terminal voltage below the maximum inverter output voltage, and control becomes unstable. A similar phenomenon can be produced also in a so-called embedded-type permanent magnet motor which outputs combined permanent magnet and reluctance torque by virtue of the fact that the permanent magnet is embedded within the rotor core.

SUMMARY OF THE INVENTION

Accordingly, one object of the present invention is to provide a novel motor control device wherein it is possible to implement field-weakening control in a stable and effective manner whatever torque is output, thus solving the abovementioned problem.

With a view to achieving the abovementioned object, the present invention is a motor control device for controlling a permanent magnet reluctance motor which generates torque corresponding to the combined value of the torque resulting from the permanent magnet and the reluctance torque, having a means of correction which serves to correct the current command value in such a manner as to prevent the motor terminal voltage from exceeding the maximum inverter output voltage, and a means of variation which serves to render the angle between the current command value from this means of correction and the motor rotor variable in accordance with the magnitude of the given torque command.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

With reference now to the drawings, wherein like codes denote identical or corresponding parts throughout the several views, and more particularly to FIG. 2 thereof, one embodiment of the present invention will be described.

(The First Embodiment)

Figure 1:
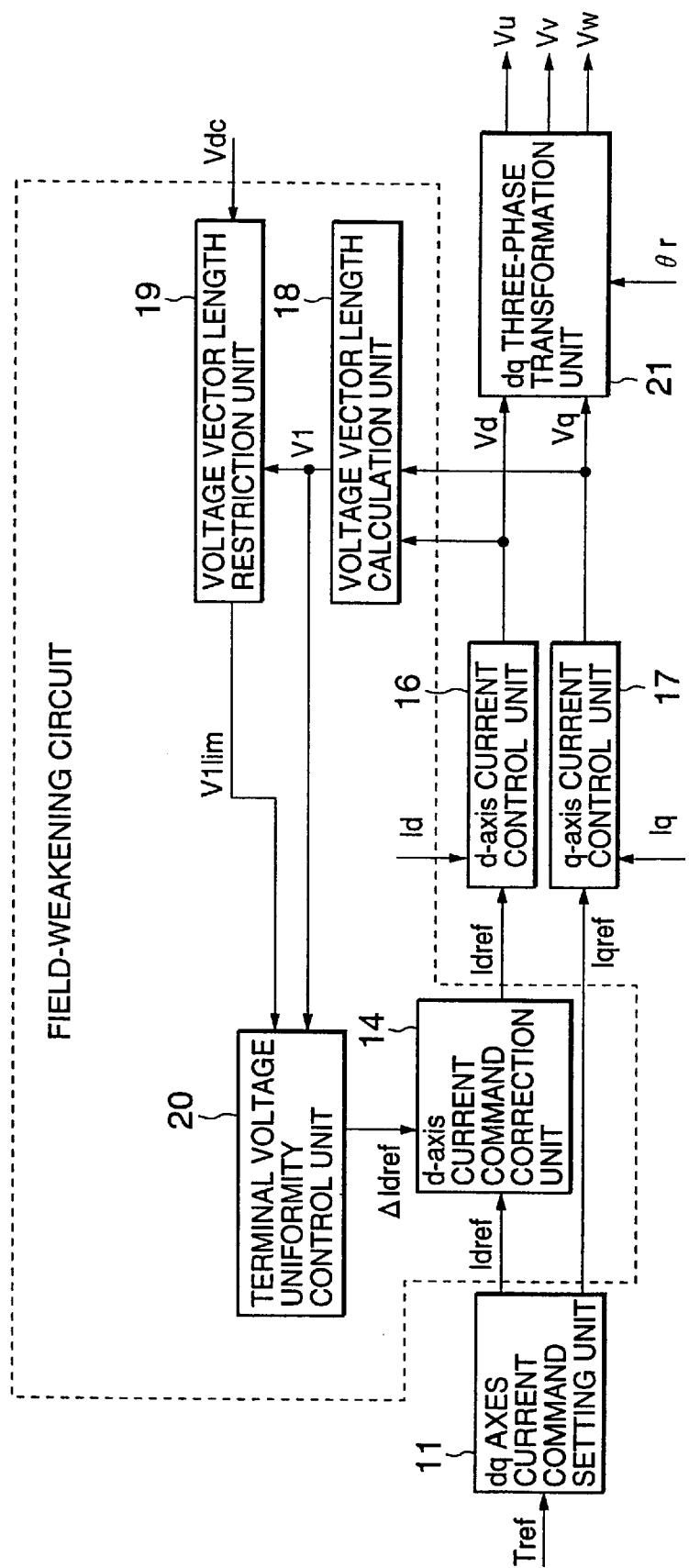
FIG. 1 is a block diagram illustrating a conventional motor control device.
Figure 2:
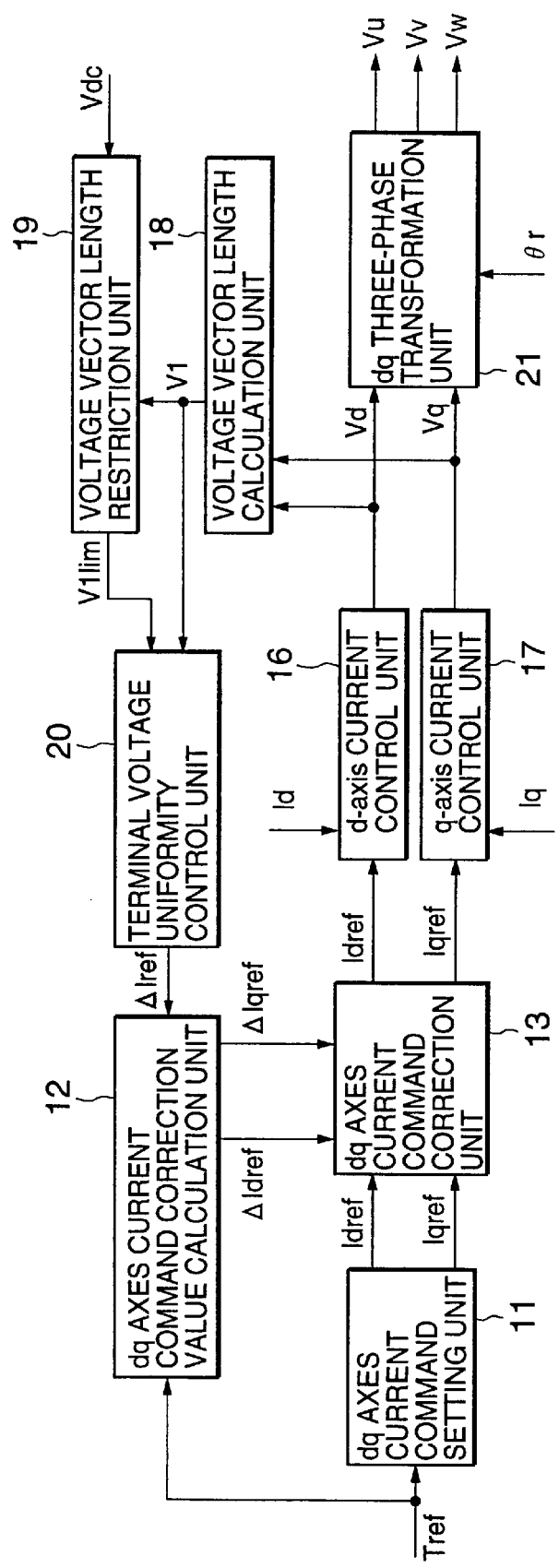
FIG. 2 is a block diagram of control device illustrating a first embodiment of the present invention.
Figure 3:
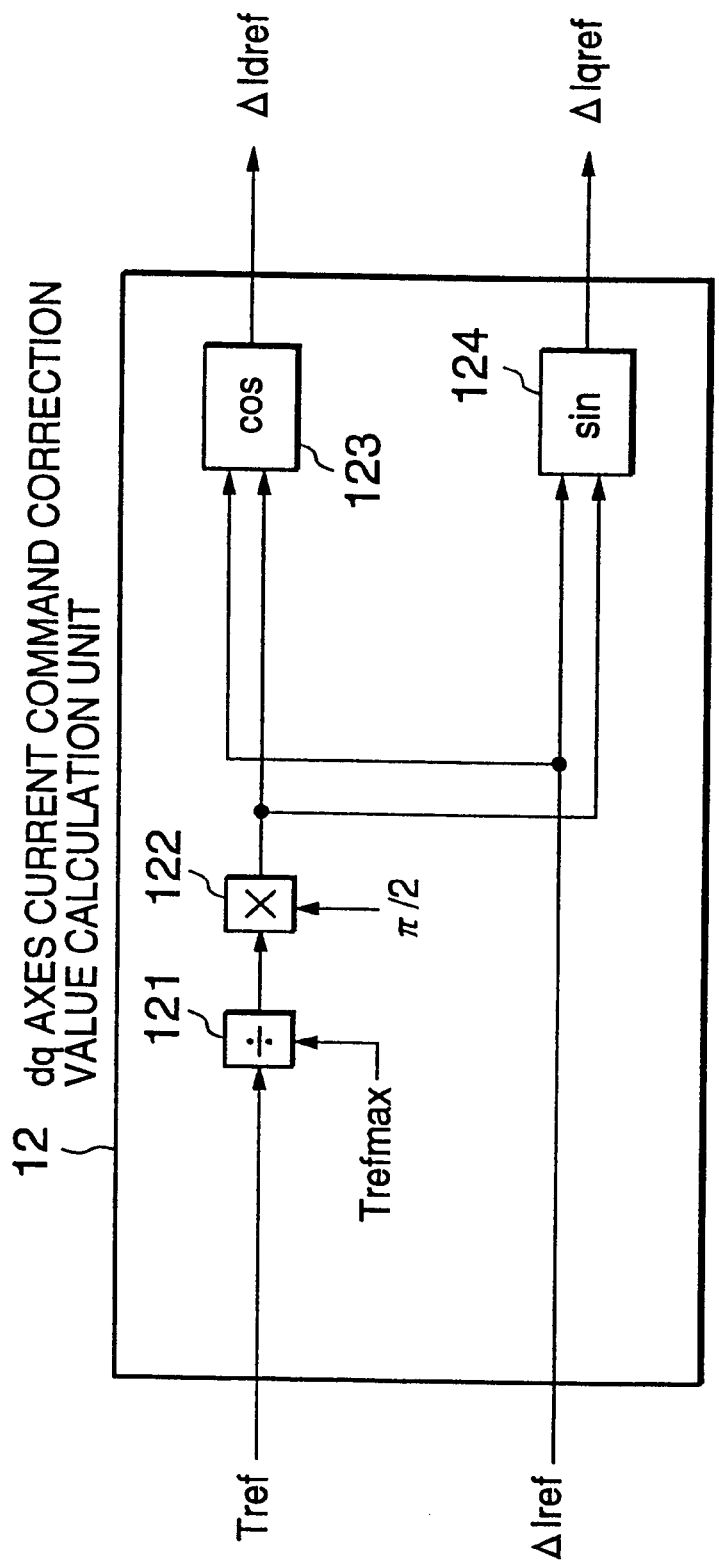
FIG. 3 is a block diagram illustrating the detailed configuration of the dq-axis current command correction value calculation unit in the first embodiment.

FIGS. 2 and 3 illustrate a first embodiment of the motor control device to which the present invention pertains. The device as illustrated in FIG. 2 has a dq axes current command setting unit 11, a dq axes current command correction value calculation unit 12, a dq axes current command correction unit 13, a d-axis current control unit 16, a q-axis current control unit 17, a voltage vector length calculation unit 18, a voltage vector length restriction unit 19, a terminal voltage uniformity control unit 20, and a dq three-phase transformation unit 21.

The dq axes current command setting unit 11 inputs a torque command Tref, and determines and outputs the d-axis current command Idref and q-axis current command Iqref which are most suitable for outputting that torque. The values selected for the two axis output commands Idref, Iqref are, for instance, those at which the motor current vector length Ilref required to output the same torque is at its minimum. In this case the two axis current commands Idref, Iqref can be determined with the aid of the following formula.

$$I\ dref = \{-\Phi pm - \sqrt{(\Phi pm^2 + 8 \cdot \Delta L^{2 \cdot I\ Iref^{(2)}})}\}/(4 \cdot \Delta L) \quad (1)$$

Here, Φpm is the magnetic flux of the permanent magnet, ΔL=Ld−Lq, Ld is the d-axis inductance, Lq is the q-axis inductance, and L ref is the current amplitude, whereby the following condition holds.

$$I\ lref = \sqrt{(I\ dref^{2} + I\ qref^{(2)})} \quad (2)$$

The d-axis current Id and q-axis current Iq which satisfy Formula (1) when modified with the current amplitude Ilref as a parameter are determined, after which the torque T generated by the motor in such cases is determined with the aid of the following formula.

$$T = p \cdot (\Phi pm + \Delta L \cdot I\ d) \cdot I\ q \quad (3)$$

Here, p is the motor pole number (pole twin number).

Figure 4:
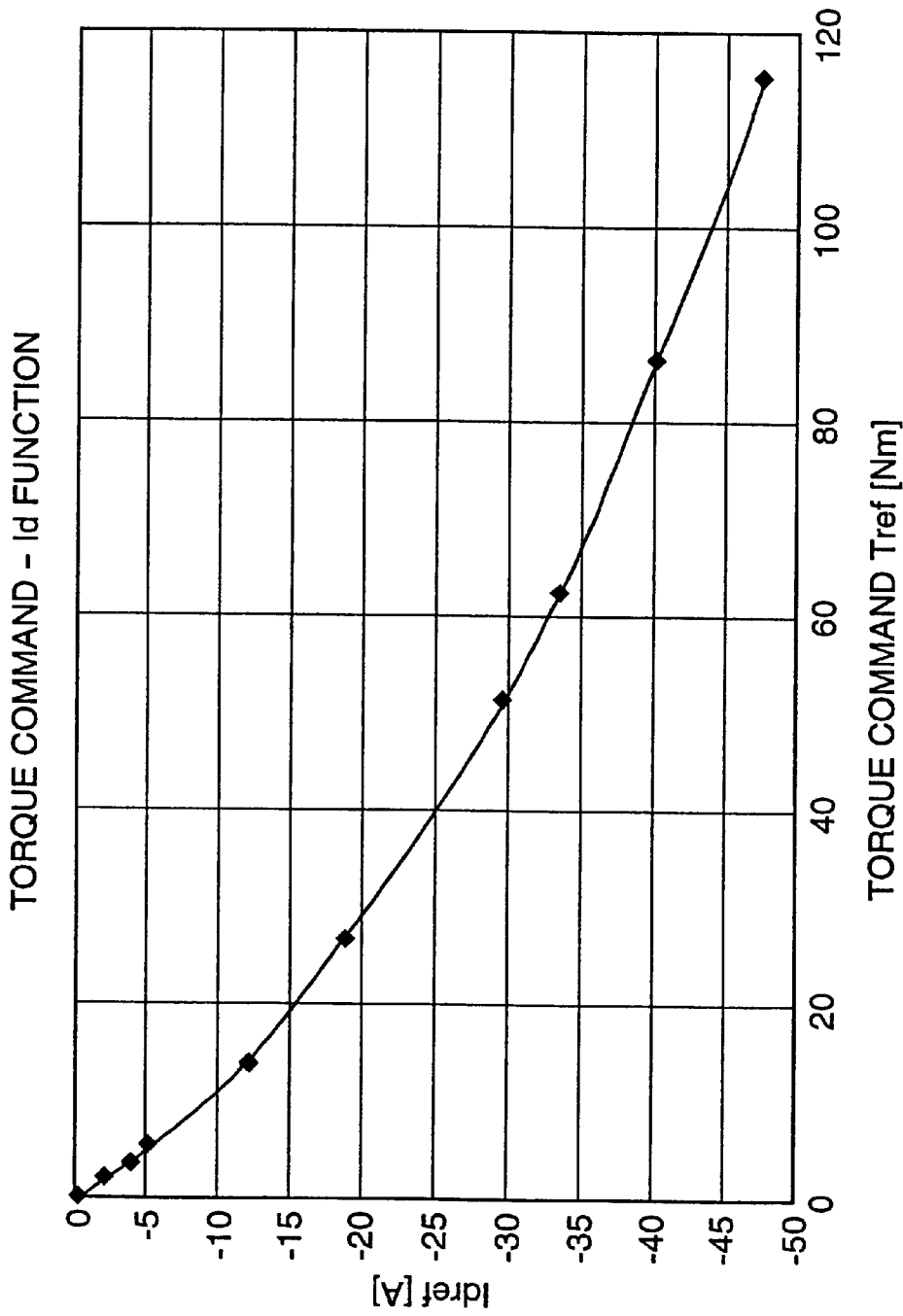
FIG. 4 is a graph illustrating the relationship between the input torque command of the dq-axis current command setting unit and the output d-axis current command.
Figure 5:
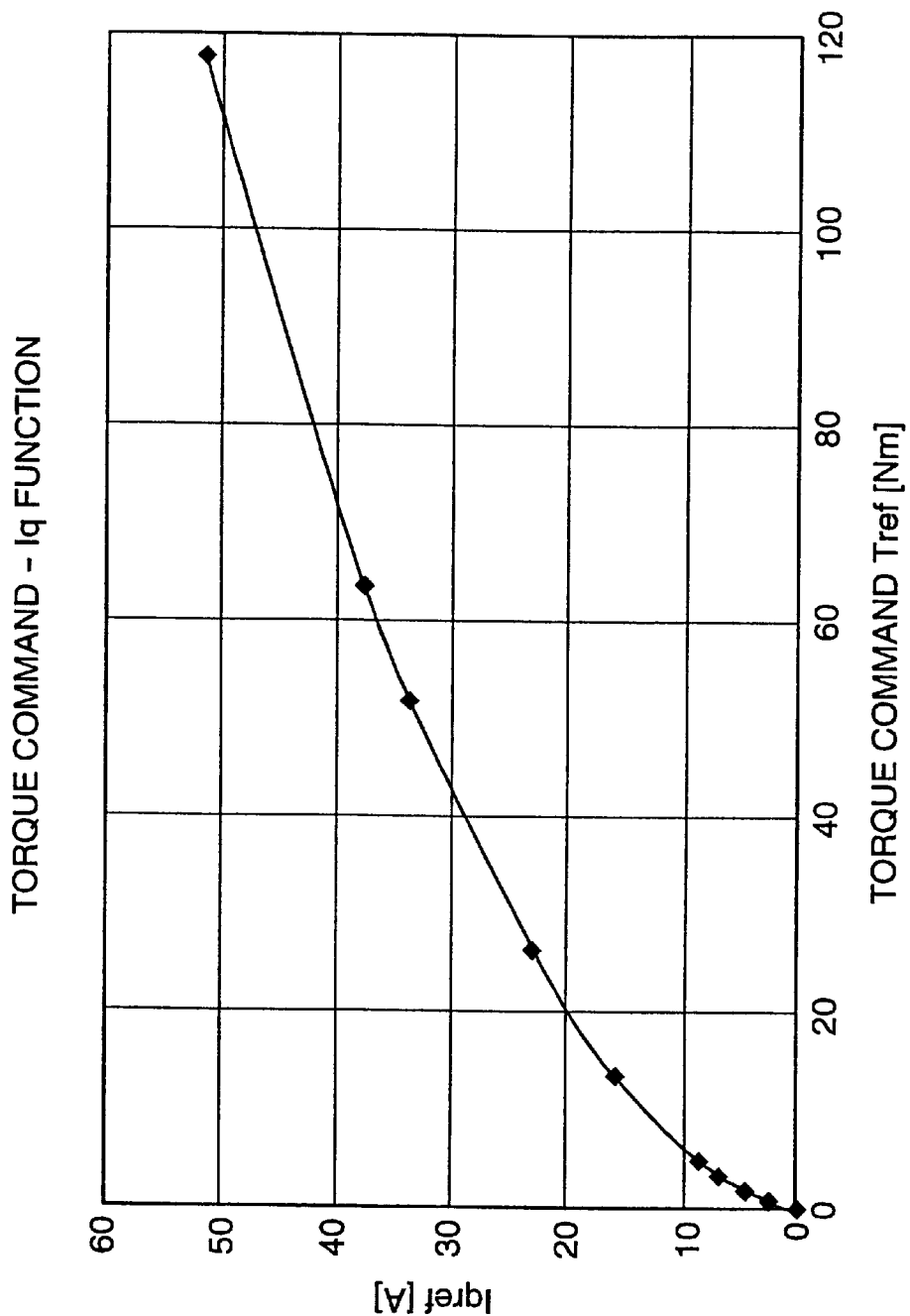
FIG. 5 is a graph illustrating the relationship between the input torque command of the dq-axis current command setting unit and the output q-axis current command.

Taking the example of a motor equivalent circuit constant, FIG. 4 illustrates the functional relationship between the motor torque command Tref and the d-axis current command where Φpm=0.09, Ld=15 mH, and the motor pole number p=4. The d-axis current command Idref is output, having been determined from the input torque command Tref in accordance with the coefficient graph of FIG. 4. In the same manner, the q-axis current command Iqref is output, having been determined from the input torque command Tref in accordance with the functional characteristic of FIG. 4.

The action of the dq axes current command correction value calculation unit 12 will be described with reference to FIG. 3. The dq axes current command correction value calculation unit 12 has a divider 121, a multiplier 122, a cosine calculator 123 and a sine calculator 124. As a whole it inputs the current command correction value ΔIref output from the terminal voltage uniformity control unit 20, determining and outputting the d-axis current command correction value ΔIdref and q-axis current command correction value ΔIqref in accordance with the following calculation. Firstly, the ratio Trate of the input torque command Tref to the maximum torque command value Trefmax is determined as $$T\ rate = T\ ref/T\ refmax \quad (4)$$

by the divider 121 and output to the multiplier 122. The multiplier 122 multiplies the ratio Trate by π/2 and outputs Trate·π/2. Using this Trate·π/2 and the d-axis current command correction value ΔIref, the cosine calculator 123 and sine calculator 124 perform the following calculation to determine the d-axis current command correction value ΔIdref and q-axis current command correction value ΔIqref as follows.

$$\Delta I\ dref = \Delta I\ ref \cdot \cos(T\ rate \cdot \pi/2) \quad (5)$$

$$\Delta I\ qref = \Delta I\ ref \cdot \sin(T\ rate \cdot \pi/2) \quad (6)$$

The dq axes current command correction unit 13 inputs the d-axis current command Idref and q-axis current command Iqref output from the dq axes current command setting unit 11, together with the d-axis current command correction value ΔIdref and q-axis current command correction value ΔIqref output from the dq axes current command correction value calculation unit 12, determining and outputting a new d-axis current command Idref and q-axis current command Iqref corrected according to the following calculations.

$$I\ dref = I\ dref + \Delta I\ dref \quad (7)$$

$$I\ qref = I\ qref + \Delta I\ qref \quad (8)$$

The d-axis current control unit 16 inputs the d-axis current command Idref output from the dq axes current command correction unit 13 and the d-axis current feedback value Id, determining and outputting the d-axis voltage command Vd as $$Vd = (Kp + Ki/s) \cdot (I\ dref - I\ d) \quad (9)$$

so that the d-axis current Id traces the d-axis current command Idref. Here, s is a Laplace operator, Kp is the relative gain, and Ki is the integral gain.

Similarly, the q-axis current control unit 17 inputs the q-axis current command Iqref output from the dq axes current command correction unit 13 and the q-axis current feedback value Id, determining and outputting the q-axis voltage command Vq as $$Vq = (Kp + Ki/s) \cdot (I\ qref - I\ q) \quad (10)$$

so that the q-axis current Iq traces the q-axis current command Iqref.

The voltage vector length calculation unit 18 inputs the d-axis voltage command Vd output from the d-axis current control unit 16 and the q-axis voltage command Vq input from the q-axis current control unit 17, determining and outputting the voltage vector length Vl as $$Vl=\sqrt{(Vd^2+Vq^2)} \quad (11)$$

The voltage vector length restriction unit 19 inputs the voltage vector length Vl output from the voltage vector length calculation unit 18, and the inverter input direct-current voltage Vdc, determining the restricted voltage vector restriction length Vllim. As a result, the maximum voltage Vlmax is here first determined as $$V1\ max = 0.9 \cdot \sqrt{6} \cdot V\ dc/\pi \quad (12)$$

This Formula (12) represents fundamental wave voltage amplitude in one-pulse waveform voltage mode, which is to say a mode wherein one-pulse waveform voltage is output so as to turn the inverter switching element on and off once for each output frequency cycle. The coefficient 0.9 in the formula is the one required to set this at a value 10% lower in order to give control margin.

Next, the terminal voltage Vl and maximum voltage Vlmax obtained in Formula (12) are compared with the aid of the following formulae.
When $$Vl<Vlmax,\ Vllim=Vl \quad (13)$$

When $$Vl>Vlmax,\ Vllim=Vlmax \quad (14)$$

In this manner, the restricted voltage vector restriction length Vllim is output.

The terminal voltage uniformity control unit 20 inputs the voltage vector length Vl output from the voltage vector length calculation unit 18 and the voltage vector length Vllim output from the voltage vector length restriction unit 19, determining the current command correction value ΔIref as $$\Delta I\ ref = G(s) \cdot (Vllim - Vl) \quad (15)$$

Here, s is a Laplace operator, and G (s) is the control gain. The control gain of proportional/integral control may be thought of as the control gain G(s). It has already been noted that current command correction value ΔIref determined here is used by the dq axes current command correction value calculation unit 12.

The dq three-phase transformation unit 21 inputs the d-axis voltage command Vd output from the d-axis current control unit 16, the q-axis voltage command output from the q-axis current control unit 17, and the motor rotor phase θr, determining the UVW three-phase voltage commands Vu, Vv and Vw as $$Vl=\sqrt{(Vd^2+Vq^2)} \quad (16)$$

$$\Delta V=\tan^{-1}(Vq/Vd) \quad (17)$$

$$Vu=\sqrt{(2/3)} \cdot Vl \cdot \cos(\theta+\delta V) \quad (18)$$

$$Vv=\sqrt{(2/3)} \cdot Vl \cdot \cos(\theta+\delta V-2\pi/3) \quad (19)$$

$$Vw=\sqrt{(2/3)} \cdot Vl \cdot \cos(\theta+\delta V-4\pi/3) \quad (20)$$

By controlling a permanent magnet reluctance motor in this manner it is possible to implement field-weakening control, and ensure that this is stable and effective whatever torque is output.

(The Second Embodiment)

Figure 6:
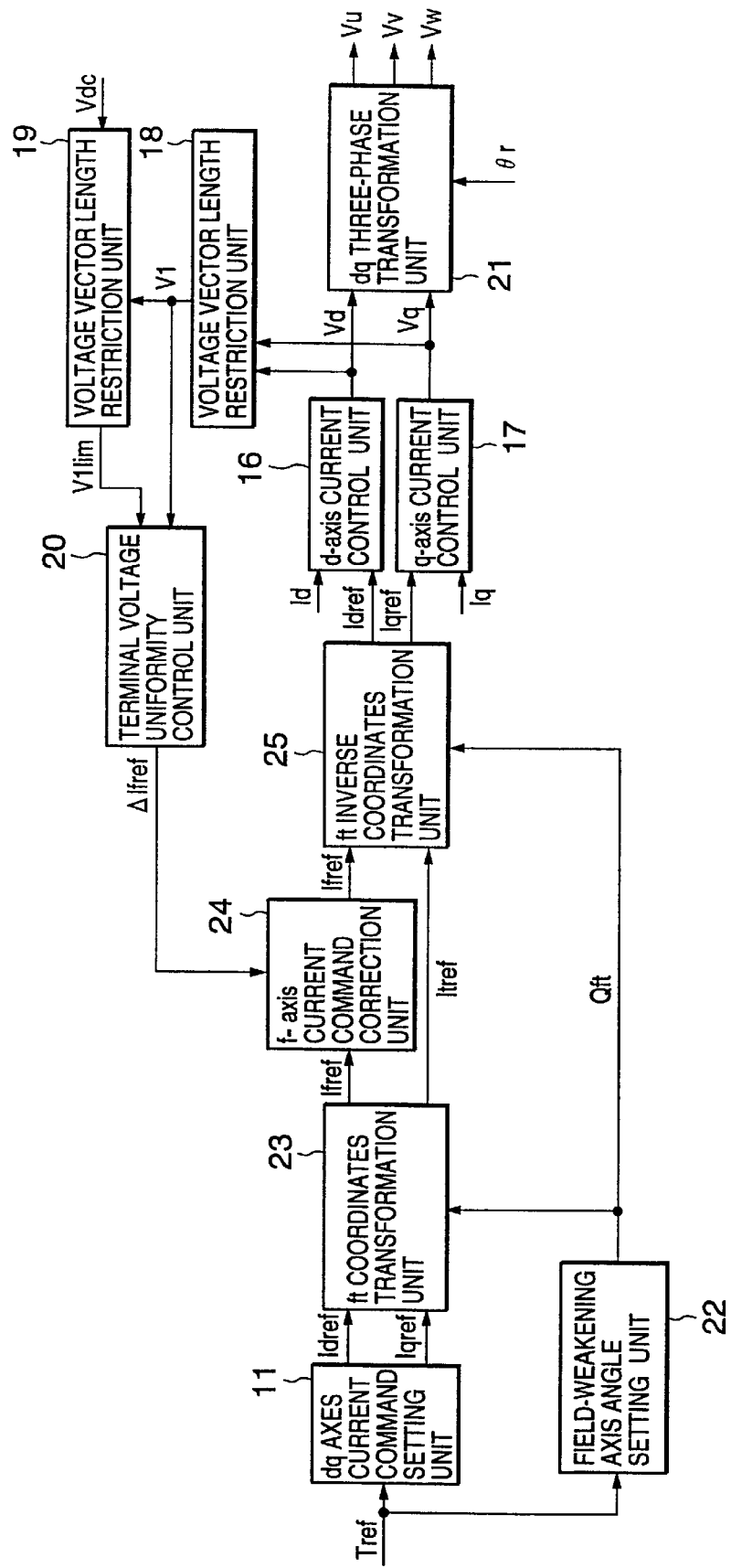
FIG. 6 is a block diagram of control device illustrating a second embodiment of the present invention.

There follows a description of a second embodiment with reference to FIG. 6. This motor control device has a dq axes current command setting unit 11, a field-weakening axis angle setting unit 22, an ft coordinates transformation unit 23, an f-axis current command correction unit 24, an ft inverse coordinates transformation unit 25, a d-axis current control unit 16, a q-axis current control unit 17, a voltage vector length calculation unit 18, a voltage vector length restriction unit 19, a terminal voltage uniformity control unit 20, and a dq three-phase transformation unit 21. Those component elements which are the same as or correspond to component elements of the control device illustrated in FIG. 2 have been allocated the same codes, and will not be described separately.

The field-weakening axis angle setting unit 22 inputs the torque command Tref, outputting the maximum field-weakening angle value or an approximation thereto as the field-weakening angle establishment value Qft. To give an example here of an output approximation, the field-weakening angle setting value Qft may be determined by the following formula $$Qft=(\pi/2) \cdot (Tref/Trefmax) \quad (21)$$

with the maximum torque command value as Trefmax.

On the basis of the d-axis current command Idref and the q-axis current command Iqref output from the dq axes current command setting unit 11, and the field-weakening angle establishment value Qft output from the field-weakening axis angle setting unit 22, the ft coordinates transformation unit 23 determines the f-axis current command Ifref and t-axis current command Itref as $$\begin{pmatrix} I\ fref \\ I\ tref \end{pmatrix} = \begin{pmatrix} \cos(Qft) & \sin(Qft) \\ -\sin(Qft) & \cos(Qft) \end{pmatrix} \begin{pmatrix} I\ dref \\ I\ qref \end{pmatrix} \quad (22)$$

The f-axis current command correction unit 24 inputs the f-axis current command Ifref output from the ft coordinates transformation unit 23 and the f-axis current command correction value ΔIfref output from the terminal voltage uniformity control unit 20, determining the corrected new f-axis current command Ifref as $$Ifref=Ifref+\Delta Ifref \quad (23)$$

and feeding it to the ft inverse coordinates transformation unit 25.

The ft inverse coordinates transformation unit 25 inputs the f-axis current command Ifref output from the f-axis current command correction unit 24, the t-axis current command Itref output from the ft coordinates transformation unit 23, and the field-weakening angle establishment value Qft output from the field-weakening axis angle setting unit 22, determining a new d-axis current command Idref and q-axis current command Iqref as $$\begin{pmatrix} I\ dref \\ I\ qref \end{pmatrix} = \begin{pmatrix} \cos(Qft) & -\sin(Qft) \\ \sin(Qft) & \cos(Qft) \end{pmatrix} \begin{pmatrix} I\ fref \\ I\ tref \end{pmatrix} \quad (24)$$

Using the d-axis current command Idref and q-axis current command Iqref determined in this manner makes it possible in the end to obtain the phase voltage commands Vu, Vv and Vw with the aid of Formulae (18)–(20), thus facilitating motor control and ensuring that this is stable and effective whatever torque is output.

(The Third Embodiment)

Figure 7:
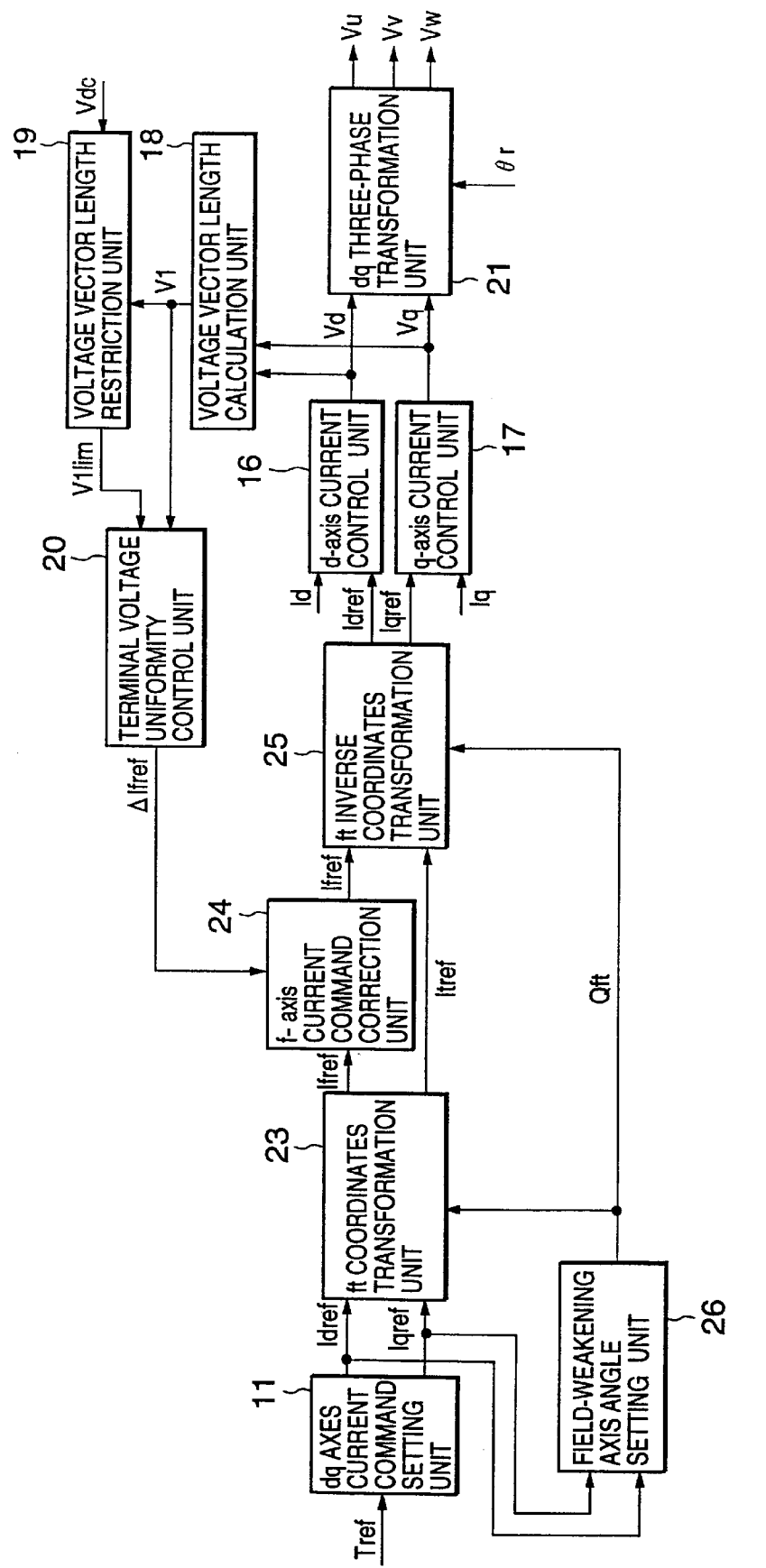
FIG. 7 is a block diagram illustrating a third embodiment of the present invention.
Figure 8:
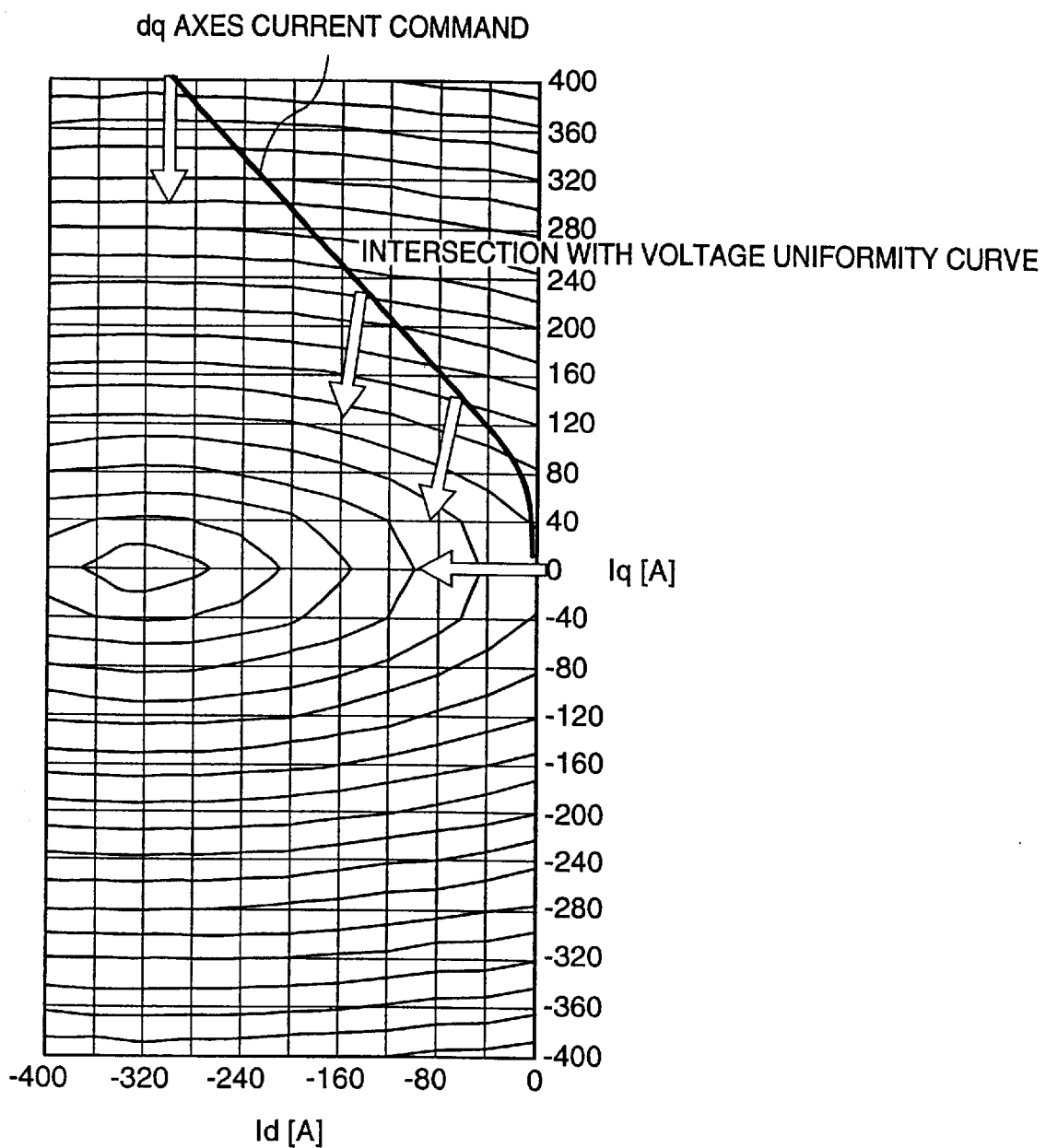
FIG. 8 is a characteristic diagram which serves to explain the content of calculations implemented in the field-weakening axis angle setting unit.

There follows a description of a third embodiment with reference to FIGS. 7 and 8. This embodiment closely resembles the control device illustrated in FIG. 6, and the majority of the component elements are common to both. The only difference is the field-weakening axis angle setting unit 26. This does not determine the field-weakening angle establishment value Qft from the torque command Tref, but instead inputs the d-axis current command Idref and q-axis current command Iqref output from the dq axes current command setting unit 11, referring to the characteristic diagram of terminal voltages (FIG. 8) determined experimentally in advance on the dq current command coordinates to set and output the field-weakening angle setting value Qft in a direction centripetal to the terminal voltage uniformity curve where the terminal voltage is low.

FIG. 8 illustrates the terminal voltage uniformity curve in a motor and dq-axis coordinates where the magnetic flux of the permanent magnet Φpm, d-axis inductance Ld and q-axis inductance Lq are respectively 0.0573[Wb], 1.81 [mH] and 4.46[mH]. The field-weakening angle establishment value Qft is set in a direction centripetal to the equivalent terminal voltage curve (direction of the arrow in the drawing) at the dq axes current command point output from the dq axes current command setting unit 11.

In this manner it is possible to implement stable field-weakening control in the same manner as in the first and second embodiments whatever torque is output. Moreover, inasmuch as the field-weakening control is more apt, it is possible to reduce the required current capacity by minimizing the field-weakening current needed in order to ensure that the terminal voltage is below a certain level.

(The Fourth Embodiment)

Figure 9:
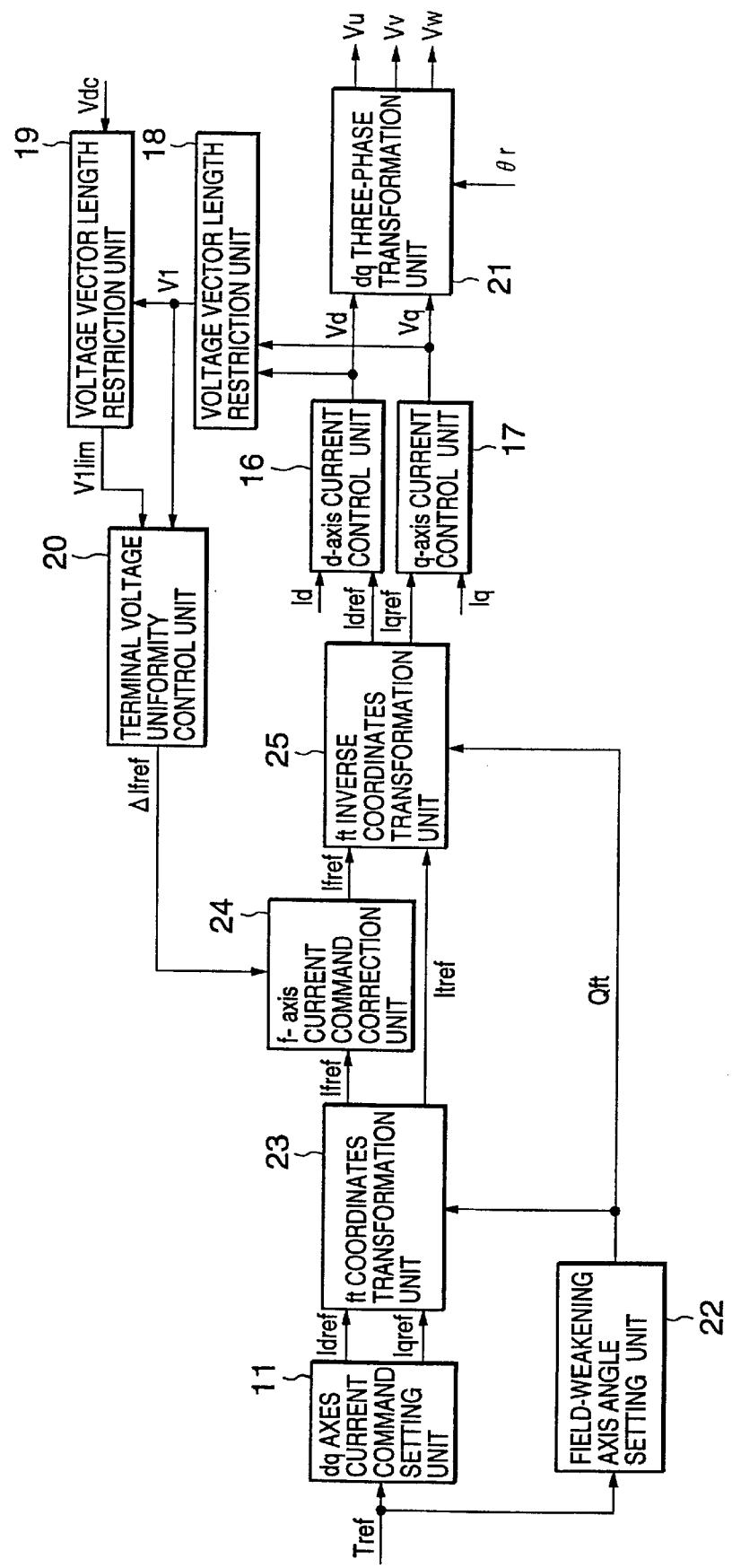
FIG. 9 is a block diagram of control device illustrating a fourth embodiment of the present invention.

There follows a description of a fourth embodiment with reference to FIG. 9. This embodiment closely resembles the control device illustrated in FIG. 6, and the majority of the component elements are common to both. The only difference is the content of the ft coordinates transformation unit 23, the remainder being the same. The ft coordinates transformation unit 23 inputs the dq axes current commands Idref, Iqref output from the dq axes current command setting unit 11 along with the field-weakening angle establishment value Qft output from the field-weakening axis angle setting unit 22, determining and outputting the f-axis current command Ifref and t-axis current command Itref.

If each of the motor three-phase output terminals is short-circuited, a negative d-axis current Id flows to the motor coils as a result of the motor inductive voltage. If the Idz is the d-axis current at this time, this d-axis current Idz can be determined with the aid of $$Idz = \Phi pm/Ld \quad (25)$$

$$\begin{pmatrix} I\,fref \\ I\,tref \end{pmatrix} = \begin{pmatrix} \cos(Qft) & \sin(Qft) \\ -\sin(Qft) & \cos(Qft) \end{pmatrix} \begin{pmatrix} I\,dref + I\,dz \\ I\,qref \end{pmatrix} \quad (26)$$

by using the magnetic flux of the permanent magnet Φpm and the d-axis inductance Ld as motor equivalent circuit constants.

The abovementioned coordinate transformation shows that the point of origin of the ft coordinates axis shifts Idz in the direction of the d-axis, while the phase angle rotates by the angle Qft. If field-weakening control is implemented as far as the point of origin of the ft coordinates axis, the result is that the motor terminal voltage becomes zero and comes to be in the direction where field weakening works most reliably.

The ft inverse coordinates transformation unit 25 inputs the f-axis current command Ifref output from the f-axis current command correction unit 24, the t-axis current command Itref output from the f-axis current command correction unit 27, and the field-weakening angle setting value Qft output from the field-weakening axis angle setting unit 22, determining the new d-axis current command Idref and q-axis current command Iqref by means of the following calculation.

If each of the motor three-phase output terminals is short-circuited, a negative d-axis current Id flows to the motor coils as a result of the motor inductive voltage. If the Idz is the d-axis current at this time, this d-axis current Idz can be determined with the aid of $$Idz = \Phi pm/Ld \quad (27)$$

$$\begin{pmatrix} I\,dref \\ I\,qref \end{pmatrix} = \begin{pmatrix} \cos(Qft) & -\sin(Qft) \\ \sin(Qft) & \cos(Qft) \end{pmatrix} \begin{pmatrix} I\,fref \\ I\,tref \end{pmatrix} - \begin{pmatrix} I\,dz \\ 0 \end{pmatrix} \quad (28)$$

by using the magnetic flux of the permanent magnet Φpm and the d-axis inductance Ld as motor equivalent circuit constants.

In this manner it is possible to implement stable field-weakening control in the same manner as in the first and second embodiments whatever torque is output. What is more, its is also possible to implement field-weakening control in a stable and effective manner without dispersing terminal voltage uniformity control even when the torque command changes rapidly during field-weakening control.

(The Fifth Embodiment)

Figure 10:
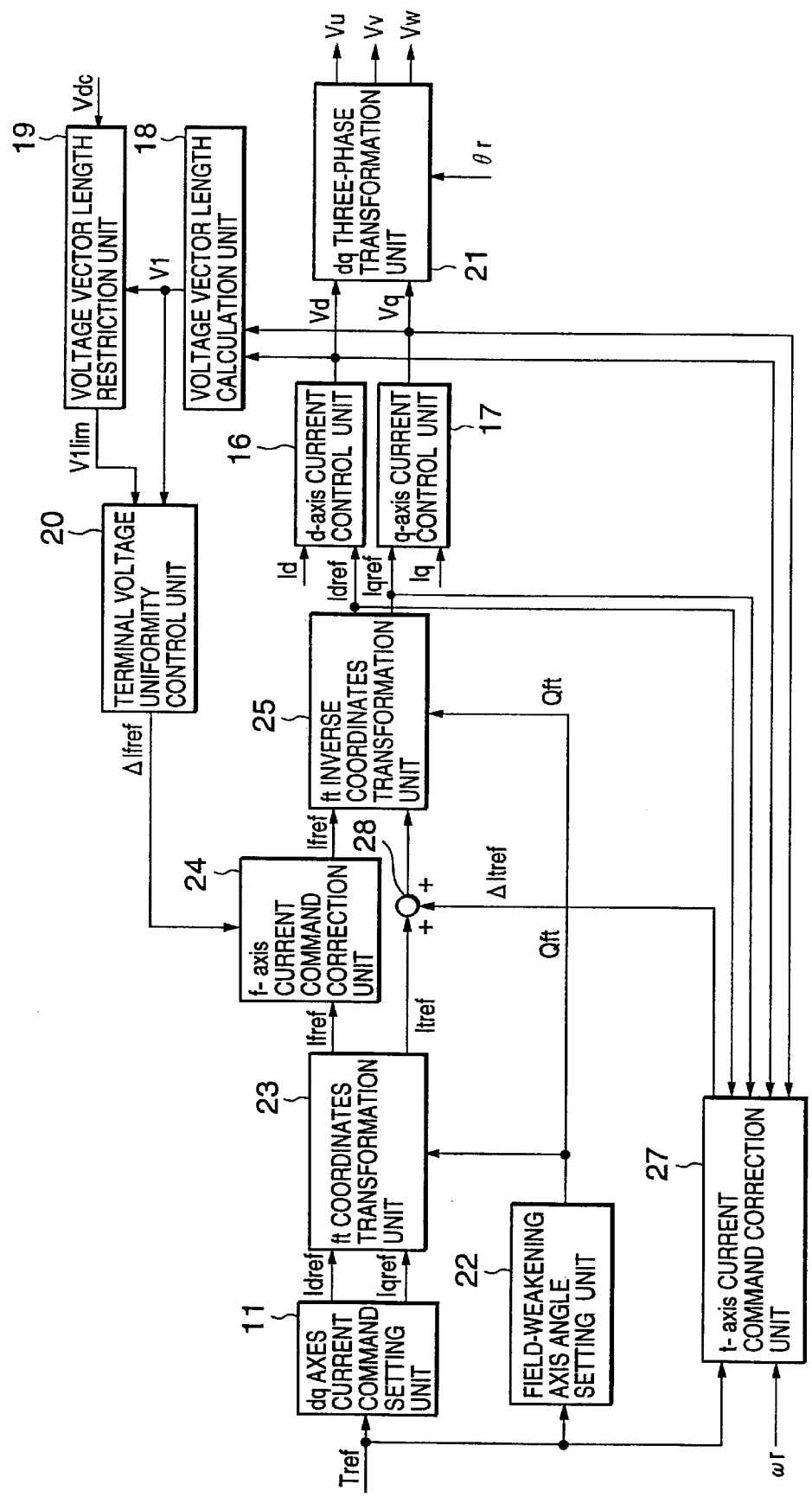
FIG. 10 is a block diagram of control device illustrating a fifth embodiment of the present invention.

There follows a description of a fifth embodiment with reference to FIG. 10. The only difference between this and the embodiment illustrated in FIG. 9 is the addition of a t-axis current command correction unit 27 which serves to calculate the t-axis current command correction value ΔItref in order to correct the t-axis current command Itref. All other component elements are the same as those of FIG. 9. This f-axis current command correction unit 27 inputs the torque command Tref, the motor rotation angle speed ωr, the d-axis voltage Vd output from the d-axis current control unit 16, the q-axis voltage Vq output from the q-axis current control unit 17, and the dq axes current commands Idref, Iqref output from the ft inverse coordinates transformation unit 25, determining the t-axis current command correction value ΔItref. This is achieved firstly by determining the effective power command Pref as $$Pref = Tref \cdot \omega r \quad (29)$$

Next, the effective power calculation value Pcal is determined as $$Pcal = Vd \cdot Idref + Vq \cdot Iqref \quad (30)$$

The results of these calculations are then used to determine the t-axis current command correction value Δtref as $$\Delta Itref = G(s) \cdot (Pref - Pcal) \quad (31)$$

Here, s is a differential operator, and G(s) is the control gain in proportional/integral control and elsewhere.

The t-axis current command correction value ΔItref obtained in this manner is added in the adder 28 to the t-axis current command Itref output by the ft coordinates transformation unit 23 to yield the new t-axis current command Itref, which is fed to the ft inverse coordinates transformation unit 25. In other words, the function of the adder 28 is $$Itref = Itref + \Delta Itref \quad (32)$$

In this manner it is possible to implement stable field-weakening control in the same manner as in the first and second embodiments whatever torque is output. Moreover, it is possible to improve the degree of matching between the output torque and the torque command value.

(The Sixth Embodiment)

Figure 11:
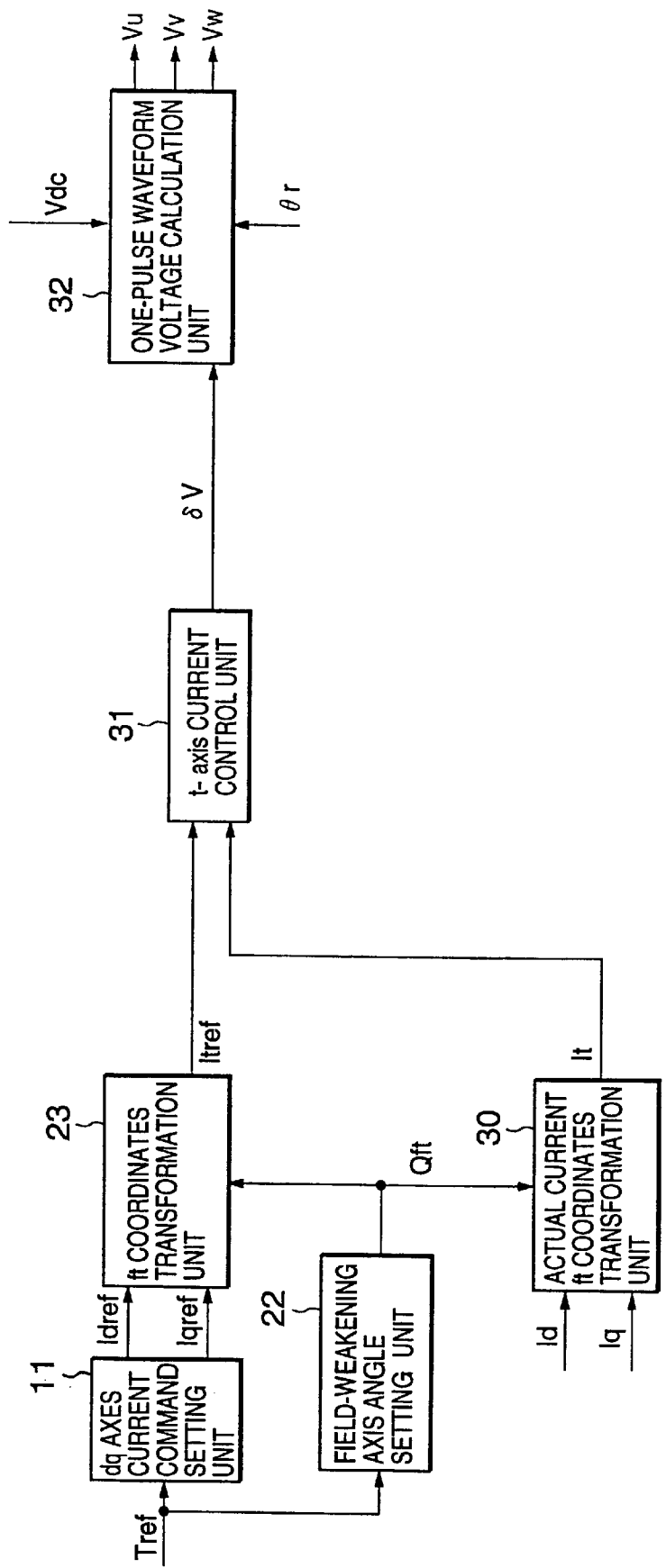
FIG. 11 is a block diagram of control device illustrating a sixth embodiment of the present invention.

There now follows a description of a sixth embodiment with reference to FIG. 11. The control device of this embodiment has a dq axes current command setting unit 11, a field-weakening axis angle setting unit 22, an ft coordinates transformation unit 29, an actual current ft coordinates transformation unit 30, a t-axis current control unit 31, and a one-pulse waveform voltage calculation unit 32.

The functions of the dq axes current command setting unit 11 and the field-weakening axis angle setting unit 22 are the same as those of the respective component elements of the control device illustrated in FIG. 6 and already described.

The ft coordinates transformation unit 29 inputs the dq axes current commands Idref, Iqref output from the dq axes current command setting unit 11 and the field-weakening angle establishment value Qft output from the field-weakening axis angle setting unit 22, determining the t-axis current command Itref as $$Itref = -Idref \cdot \sin(Qft) + Iqref \cdot \cos(Qft) \tag{33}$$

The actual current ft coordinates transformation unit 30 inputs the dq axes current feedback values Id, Iq and the field-weakening angle establishment value Qft output from the field-weakening axis angle setting unit 22, determining the t-axis current command It as $$It = -Id \cdot \sin(Qft) + Iq \cdot \cos(Qft) \tag{34}$$

The t-axis current control unit 31 inputs the t-axis current command Itref of Formula (33) output from the ft coordinates transformation unit 29 and the t-axis current command It output from the actual current ft coordinates transformation unit 30, determining the voltage phase angle $\delta V$ as $$\delta V = G(s) \cdot (Itref - It) \tag{35}$$

Here, s is a differential operator, and G(s) is the control gain in proportional/integral control and elsewhere.

The one-pulse waveform voltage calculation unit 32 inputs the voltage phase angle $\delta V$ of Formula (35) output from the t-axis current control unit 31, the motor rotor potential $\theta r$, and the inverter input direct-current voltage Vdc, determining the three-phase one-pulse waveform voltages Vu, Vv and Vw. Here, the first step is to determine the three-phase sine waves Vuo, Vvo and Vwo as $$Vuo = \cos(\theta r + \delta V) \tag{36}$$

$$Vvo = \cos(\theta r + \delta V - 2\pi/3) \tag{37}$$

$$Vwo = \cos(\theta r + \delta V - 4\pi/3) \tag{38}$$

Next, the three-phase one-pulse waveform voltages Vu, Vv and Vw are determined from the results of the calculations in accordance with the following condition portions.

When $$Vuo > 0, Vu = +Vdc/2 \tag{39}$$

When $$Vuo < 0, Vu = -Vdc/2 \tag{40}$$

When $$Vvo > 0, Vv = +Vdc/2 \tag{41}$$

When $$Vuo < 0, Vv = -Vdc/2 \tag{42}$$

When $$Vwo > 0, Vw = +Vdc/2 \tag{43}$$

When $$Vwo < 0, Vw = -Vdc/2 \tag{44}$$

In this manner it is possible to implement stable and effective field-weakening control in the same manner as in the first and second embodiments whatever torque is output. What is more, the adoption of one-pulse waveform voltages allows the inverter voltage utilization ratio to be improved, leading to lower cost and greater efficacy of the device.

The present invention makes it possible for stable and effective field-weakening control to be implemented in a motor control device which implements field-weakening control whatever torque is output.

What is claimed is:

1. A motor control device for controlling a permanent magnet reluctance motor which generates torque corresponding to a combined value of a torque resulting from a permanent magnet and a reluctance torque, comprising:

correction means for correcting a current command value so as to prevent a motor terminal voltage from exceeding a maximum inverter output voltage; and variation means in response to a magnitude of a given torque command for varying an angle of a motor to a current command value output from said correction means.

2. A motor control device for controlling a permanent magnet reluctance motor which generates torque corresponding to a combined value of a torque resulting from a permanent magnet and a reluctance torque, comprising:

a dq axes current command setting unit which calculates both a d-axis current command corresponding to an axial direction of a permanent magnet and a q-axis current command in a direction at right angles thereto on the basis of a given torque command in accordance with previously supplied patterns;

a d-axis current control unit which calculates a d-axis voltage in order to permit a d-axis current feedback value to track said d-axis current command;

a q-axis current control unit which calculates a q-axis voltage in order to permit a q-axis current feedback value to track said q-axis current command;

a voltage vector length calculation unit which determines a voltage vector length whereof a d-axis voltage and q-axis voltage are components;

a voltage vector length restriction unit which compares said voltage vector length and an inverter direct-current input voltage, and calculates a voltage vector length restriction value which is restricted in such a manner that said voltage vector length does not exceed a maximum inverter output voltage as determined in accordance with said inverter direct-current input voltage;

a terminal voltage uniformity control unit which calculates a voltage command correction value required in order to ensure that said voltage vector length tallies with said voltage vector length restriction value;

a dq axes current command correction value calculation unit which calculates a d-axis current command correction value and q-axis current command correction value in accordance with said torque command;

a dq axes current command correction unit which corrects said d-axis current command by said d-axis current command correction value, and said q-axis current command by said q-axis current command correction value; and a dq three-phase transformation unit which transforms a d-axis voltage command and q-axis voltage command into a three-phase command on the basis of said d-axis voltage output from said d-axis current control unit, said q-axis voltage output from said q-axis current control unit, and a motor rotor position detection angle.

3. A motor control device for controlling a permanent magnet reluctance motor which generates torque corresponding to a combined value of a torque resulting from a permanent magnet and a reluctance torque, comprising:

a dq axes current command setting unit which calculates both a d-axis current command corresponding to an axial direction of a permanent magnet and a q-axis current command in a direction at right angles thereto on the basis of a given torque command in accordance with previously supplied patterns;

a field-weakening axis angle setting unit which calculates a field-weakening axis angle on the basis of said torque command;

an ft coordinates transformation unit which transforms said d-axis current command and q-axis current command into an f-axis current command corresponding to a direction of said field-weakening axis angle and a t-axis current command in a direction at right angles thereto;

an f-axis current command correction unit which corrects said f-axis current command by a current command correction value;

an ft inverse coordinates transformation unit which transforms said f-axis current command and said t-axis current command corrected by said f-axis current command correction unit into new d-axis and q-axis current commands;

a d-axis current control unit which calculates a d-axis voltage in order to permit a d-axis current feedback value to track said d-axis current command obtained through said ft inverse coordinates transformation unit;

a q-axis current control unit which calculates a q-axis voltage in order to permit a q-axis current feedback value to track said q-axis current command obtained through said ft inverse coordinates transformation unit;

a voltage vector length calculation unit which determines a voltage vector length whereof a d-axis voltage and q-axis voltage are components;

a voltage vector length restriction unit which compares said voltage vector length and an inverter direct-current input voltage, and calculates a voltage vector length restriction value which is restricted in such a manner that said voltage vector length does not exceed a maximum inverter output voltage as determined in accordance with said inverter direct-current input voltage;

a terminal voltage uniformity control unit which calculates a voltage command correction value required in order to ensure that said voltage vector length tallies with said voltage vector length restriction value; and a dq three-phase transformation unit which transforms a d-axis voltage command and q-axis voltage command into a three-phase command on the basis of said d-axis voltage output from said d-axis current control unit, said q-axis voltage output from said q-axis current control unit, and a motor rotor position detection angle.

4. The motor control device according to claim 3, wherein said field-weakening axis angle setting unit calculates said field-weakening axis angle on the basis of said d-axis and q-axis current commands deduced from said torque command.

5. The motor control device according to claim 3, wherein said ft coordinates transformation unit transforms a ft coordinates by determining an origin of a ft coordinates axis as a point on a dq coordinates axis at which a short-circuit current flows when a motor is rotated with terminals thereof short-circuited.

6. The motor control device according to claim 3, further comprising:

a t-axis current command correction unit which based on said torque command, a motor rotation angle speed, and said d-axis and q-axis current commands and voltage commands output from said ft inverse coordinates transformation unit calculates a t-axis current command correction value required in order to correct derivations in a motor output torque relative to said torque command caused by correction of said f-axis current command as a result of terminal voltage uniformity control.

7. A motor control device for controlling a permanent magnet reluctance motor which generates torque corresponding to a combined value of a torque resulting from a permanent magnet and a reluctance torque, comprising:

a dq axes current command setting unit which calculates both a d-axis current command corresponding to an axial direction of a permanent magnet and a q-axis current command in a direction at right angles thereto on the basis of a given torque command;

a field-weakening axis angle setting unit which calculates a field-weakening axis angle on the basis of said torque command;

an ft coordinates transformation unit into which a d-axis current command and q-axis current command are input to obtain a t-axis current command in a direction at right angles to a direction of a field-weakening axis angle;

an actual current ft coordinates transformation unit which calculates a t-axis current on the basis of d-axis and q-axis current feedback values and said field-weakening axis angle;

a t-axis current control unit which calculates a voltage potential angle on the basis of a deviation between said t-axis current command and said t-axis current; and a one-pulse waveform voltage calculation unit which uses said voltage potential angle, inverter input direct-current voltage and a motor rotor phase to calculate a one-pulse waveform three-phase voltage command required in order to turn inverter switch elements on and off once for each output frequency cycle.

* * * * *